June 25, 1929.   O. L. WHITTLE   1,718,267
VARIABLE SPEED GEAR
Filed March 26, 1926

INVENTOR:
Oscar Lyon Whittle
BY: Ruege, Boyce & Bakelew
ATTORNEYS.

Patented June 25, 1929.

1,718,267

UNITED STATES PATENT OFFICE.

OSCAR LYON WHITTLE, OF WARRINGTON, ENGLAND.

VARIABLE-SPEED GEAR.

Application filed March 26, 1926, Serial No. 97,559, and in Great Britain May 20, 1925.

This invention has reference to variable speed gears and has for its object to provide means whereby one shaft, which is the driver, may be made to communicate its motion to another shaft and cause it to rotate at varying speeds.

According to the invention in a variable speed gear one shaft is provided with a plurality of axially movable wheels, plates or discs tapering towards the periphery, and urged toward one another by suitable means, the space between the wheels, plates or discs being adapted to receive peripheral engaging portions of complementary wheels, plates or discs axially movable on the other shaft, one or both of the shafts being mounted in such a manner that they may have a relative movement to or from each other whereby the wheels, plates or discs on the respective shafts may form a driving engagement at radially varying positions.

The invention is more particularly set forth with reference to the accompanying drawings wherein—

Figure 2:
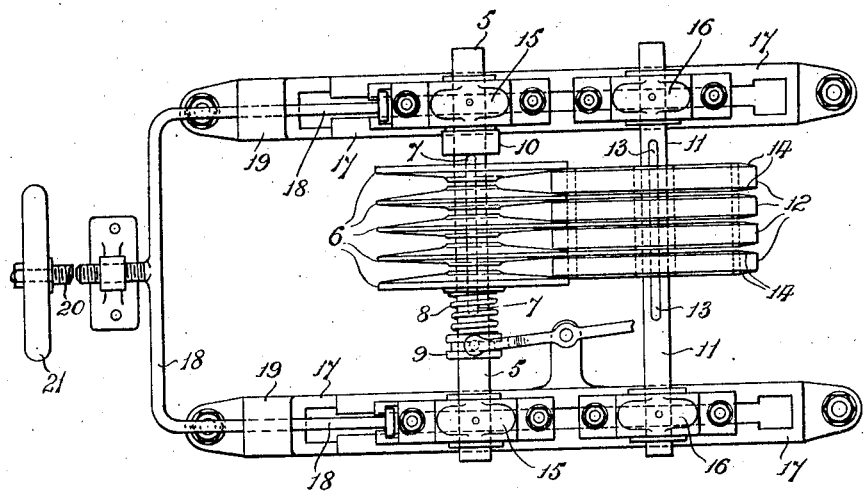
Fig. 2 is a plan thereof.
Figure 1:
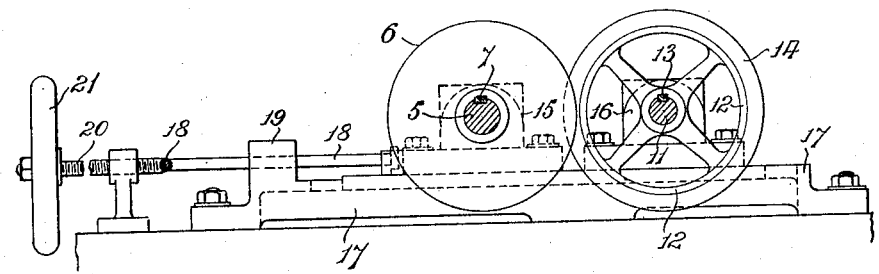
Fig. 1 is an elevation illustrating the invention in its simplest form.

In the accompanying drawings the shaft 5 which is the one to be driven has upon it a plurality of wheels, plates or discs 6 which are tapered toward the periphery. These wheels, plates or discs are rotatably connected to the shaft 5 by a key 7, or the shaft and wheels, plates or discs may be castellated, but are capable of axial movement along the shaft and are urged toward one another by the spring 8 mounted around the shaft and between a collar 9 and the end plate, a collar or the like 10 being provided on the shaft to act as a stop, and to limit the endwise movement of the plates.

The shaft 11 which drives and communicates motion to the other shaft 5, is parallel to the shaft 5, and has upon it a plurality of wheels, plates or discs 12, which are placed to alternate with the plates 6 on the shaft 5, and are mounted to slide axially but to rotate with the shaft for which purpose a key 13 is provided. Instead of a key any other suitable means may be used for effecting the same end. The wheels, plates or discs 12 have friction rims 14 tapered to the same angle as the plates 6 on the shaft 5.

The shafts 5 and 11 are mounted in bearings 15 and 16, respectively carried by supports 17 and in the construction shown the bearings 15 carrying the shaft 5 are movable to and from the shaft 11. It is however obvious that either set may be movable or if desired both sets, though the latter arrangement is only convenient in certain circumstances.

A convenient method of moving the shaft 5, to and from the shaft 11 is by a stirrup 18 running in guides 19 whereby the shaft is kept in its true alignment, moved by a screw 20 having a suitable handle 21 or a wheel.

In the drawings the wheels, plates or discs 6 and 12 are of the same diameter and this while not essential is a convenient construction, but the diameters can be in any ratio to one another.

It will however be clear that if the plates 6 are brought into frictional contact with the wheels 12 by moving the shaft 5, the rotation of the wheels 12, will be communicated to the plates 6, and if at this point the radii of the wheels 12, and the plates 6 are equal both sets will rotate at the same speed. If now the shaft 5 be moved nearer to the shaft 11 the plates 6 will be forced apart against the action of the spring 8 and at the same time the wheels 12 will also move axially, the result of this will be that the plates 6 will be rotated faster than the wheels 12, and at the same time the frictional engagement will be greater than before. If the shaft 5 be moved closer to the shaft 11 the same thing will be effected in an enhanced degree, and as the gear ratio increases the possibility of slip between the engaging wheels, plates or discs becomes less.

In the same way as the shafts are moved apart the gear ratio will be decreased steadily and evenly, the wheels, plates or discs being kept in effective contact by the axial pressure supplied.

By means of this invention a perfectly smooth and variable gear may be obtained which may also be used as a clutch, which latter effect may be obtained by providing a releasing means for the collar 9 which may be grooved to run in the end of a forked rod—whereby the pressure of the spring 8 can be released and applied at will which arrangement allows the gear to be put into and out of action at any ratio.

It is to be understood that in the embodiment of this invention illustrated and described the wheels, plates or discs having friction rims have been spoken of driving the tapered wheels, plates or discs, but if desired the functions may be reversed. It will also be seen that the gear acts as a clutch when the shafts 5 and 11 are moved to and from one another to engage or disengage.

What I claim as my invention and desire to secure by Letters Patent is:—

1. A variable speed gear mechanism comprising a pair of shafts, supports for said shafts, a series of discs upon each shaft, the discs in each series being adapted to overlap and frictionally engage the discs of the other series, and means for moving one shaft toward the other to vary the area of surface contact between said discs, the said means comprising guide members, a stirrup fastened to the movable shaft supports and moving in said guide members, a screw-threaded member engaging said stirrup, a stationary screw-threaded socket adapted to receive said screw-threaded member, means fastened to said screw-threaded member for operating the same, means for resiliently pressing one series of the discs toward each other, and means for varying the action of the last mentioned means.

2. A variable speed gear mechanism comprising a pair of shafts, supports having bearings for said shafts, a series of discs upon one shaft and a series of wheels on the other said shaft, the discs and wheels being adapted to overlap and frictionally engage, and means for moving one shaft toward the other to vary the area of surface contact between said discs and said wheels, the said means comprising guide members, a stirrup fastened to the bearings of said movable shaft and moving in said guide members, a screw-threaded member engaging said stirrup, a stationary screw-threaded socket adapted to receive said screw-threaded member, means fastened to said screw-threaded member for operating the same, means for resiliently pressing the series of discs toward each other, and means for varying the action of the last mentioned means.

In testimony whereof I have signed my name to this specification.

OSCAR LYON WHITTLE.